May 1, 1956 C. W. MUNDAY ET AL 2,744,234
MAGNETIC OXYGEN METERS

Filed July 23, 1954 3 Sheets-Sheet 1

INVENTORS
CHARLES WALTER MUNDAY.
KELVIN RICHARD PEAKIN
MICHAEL JOHN GRIFFITHS
BY Ward, Neal, Haselton, Orme & McElhannon
ATTORNEYS.

May 1, 1956

C. W. MUNDAY ET AL 2,744,234

MAGNETIC OXYGEN METERS

Filed July 23, 1954

INVENTORS
CHARLES WALTER MUNDAY.
KELVIN RICHARD PEAKIN
MICHAEL JOHN GRIFFITHS
BY Ward, Neal, Haselton, Orme & McElhannon
ATTORNEYS.

May 1, 1956 C. W. MUNDAY ET AL 2,744,234
MAGNETIC OXYGEN METERS

Filed July 23, 1954 3 Sheets-Sheet 3

INVENTORS
CHARLES WALTER MUNDAY.
KELVIN RICHARD PEAKIN
MICHAEL JOHN GRIFFITHS
BY Ward, Neal, Haselton, Orme & McElhannon
ATTORNEYS.

United States Patent Office 2,744,234
Patented May 1, 1956

2,744,234

MAGNETIC OXYGEN METERS

Charles Walter Munday, London, Kelvin Richard Peakin, Walton-on-the-Hill, and Michael John Griffiths, Ewell, England, assignors to The Distillers Company Limited, Edinburgh, Scotland, a British company Application July 23, 1954, Serial No. 445,384

Claims priority, application Great Britain August 11, 1953

11 Claims. (Cl. 324—36)

This invention is for improvements in or relating to apparatus for measuring the magnetic susceptibility of gases, and to determine their chemical components accordingly.

Apparatus of this type comprises in essence a test piece suspended in a non-uniform magnetic field and in the gas to be tested, and means for measuring the force on the test piece. Variation in the composition of the gas, creating a variation in the magnetic susceptibility of the gas, will cause a variation in the position taken in the magnetic field by the test piece and this movement of the test piece can be employed, when suitably calibrated, to determine changes in the composition of the gas being tested. An apparatus of this type is described in U. S. Patent No. 2,666,893 of January 19, 1954, and comprises a magnet and a cell providing a chamber between the facing poles of the magnet, the cell being made of a substantially non-magnetic material and having a frame and two magnetic pole pieces, shaped to produce a non-uniform magnetic field, fitting in the ends thereof, an elongated test piece suspended substantially at its centre of gravity between the two pole pieces on a fibre rigidly supported at both ends within the chamber, means for the passage of gas through the chamber, the chamber being otherwise substantially gas tight when in position between the poles of the magnet, and means for the measurement of the angular deflection of the test piece in accordance with the magnetic susceptibility of the gas in said chamber.

It is an object of the present invention to provide means for increasing the motional resistance of the test piece suspended in an inhomogeneous magnetic field in apparatus of the kind described.

It is a further object of the invention to provide a balanced apparatus whereby the test piece is maintained substantially in the position of maximum magnetic field gradient so that all measurements are recorded at the position of maximum sensitivity.

It is a further object of the invention to provide a self-balancing apparatus.

We have found that these objects can be achieved by the provision of wire loops encircling the test piece as hereinafter described.

Accordingly the present invention comprises an apparatus of the kind described in U. S. Pat. No. 2,666,893 of January 19, 1954, for measuring the magnetic susceptibility of gases, wherein a rigid frame comprising a length of wire encircles each arm of the elongated test piece separately in a loop both said loops being of substantially equal dimensions and lying in the same plane which passes longitudinally through the test piece and which is at an angle to the lines of force in the non-uniform magnetic field, the ends of said wire being conductively connected.

By the term "conductively connected" it is meant that the ends of the wire may be connected together to form a continuous loop encircling the test piece, or may be earthed and thereby short-circuited, or may be connected to means for passing an electric current through the wire.

In a preferred embodiment the wire loops lie in a plane which is substantially at right angles to the lines of force in the non-uniform magnetic field. In this position maximum sensitivity is obtained.

The test piece assumes a position in the magnetic field wherein said test piece is at an angle to, and not parallel to or coincidental with, the line of maximum magnetic force. Consequently the two loops surrounding the test piece are positioned on opposite sides of this line of maximum magnetic force. Considering each of the loops surrounding the test piece separately, as the loop is positioned in a non-uniform field, although the current induced in (or applied to) the loop is in opposing directions on the opposite sides of the loop, the resulting forces do not cancel out because of the field strength difference in the two sides thus giving rise to a net couple. The second loop round the other arm of the test piece is arranged to give a couple in the opposite direction which reinforces the motion thereby obtained.

Where a continuous loop is provided encircling the test piece as defined above movement of the test piece induces an electric current in the rigid frame and the induced moment, although very small, is of opposite sign to the motion of the test piece and thereby provides a means for increasing the motional resistance of the test piece.

Where the loop is not continuous and the ends are taken to separate electrical connections, the motion of the test piece may be controlled by the injection of a suitable electric current therethrough. The direction of the force couple is dependant on the direction of the field gradient and on the direction of the current flowing in the loop. It is thereby possible, instead of measuring the angular deflection of the test piece in accordance with the magnetic susceptibility of the gas surrounding it, to measure the amount of current needed to exactly oppose the magnetic moment tending to cause deflection thereby maintaining the test piece in a fixed position, which is suitably the position of maximum magnetic field gradient. In this way the apparatus may be operated with the test piece at all times in the position of maximum sensitivity. Such an apparatus is said to be balanced.

The operation of a balanced apparatus as described above may be carried out manually or automatically. In the former case the current supply to the wire forming the rigid frame which encircles the test piece is adjusted by hand to induce a moment equal and opposite to the magnetic moment acting on the test piece. This current, when suitably calibrated, indicates the magnetic susceptibility of the gas under test.

Alternatively, the apparatus may be made automatic or self-balancing, for instance by connecting the ends of the wire loop to the output from a feed-back amplifier associated with said test piece. In one embodiment comprising a self-balancing system of this type, the test piece or its suspension means carries a mirror adapted to reflect a light spot on to a photo-electric cell system. The deflection of the test piece, due to the magnetic moment acting on it, causes a reaction in the photo-electric cell system the output from which is amplified and applied to the two ends of the wire forming the rigid frame which encircles the test piece to induce a moment equal and opposite to the magnetic moment. The output from the amplifier also operates indicating or recording means whereby the current supplied to the test piece can be measured, and the magnetic susceptibility of the gas under test thereby calculated.

The apparatus of the present invention is of particular application to the apparatus for measuring the magnetic susceptibility of gases as described and claimed in U. S.

Pat. No. 2,666,893 of January 19, 1954 and the disclosure therein is to be read in conjunction with the present specification.

The length of wire may be made of any metal but is desirably constructed of platinum-iridium alloy or metal of similar properties. The diameter of the wire employed will correspond to the dimensions of the test piece. Where, as in the apparatus as described in U. S. Pat. No. 2,666,893 of January 19, 1954, the test piece weighs less than 5 milligrams, the wire is suitably of a diameter not exceeding 0.002 inch.

The present invention is described below, solely by way of illustration, with reference to the accompanying drawings.

Figure 1:
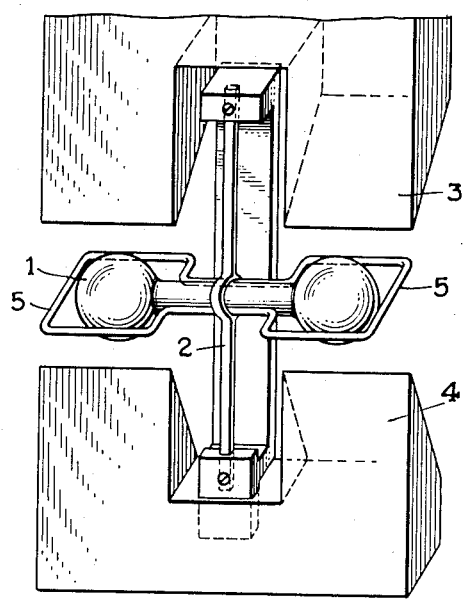
Figure 1 is a perspective view of part of one form of the apparatus according to the present invention.
Figure 2:
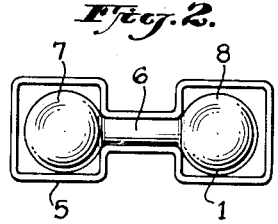
Figure 2 is a top view of the test piece and loops of Figure 1.
Figure 3:
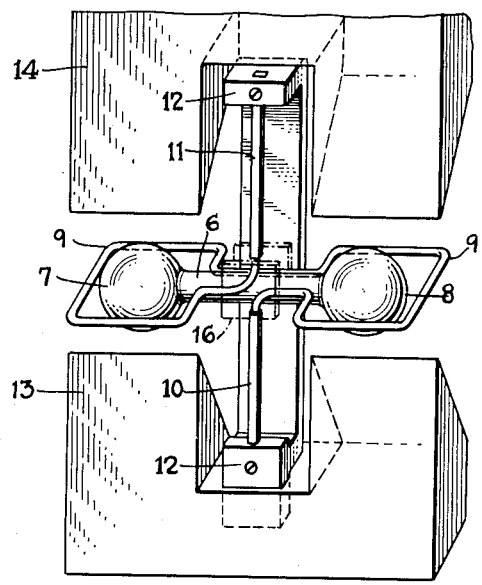
Figure 3 is a perspective view of part of a further form of the apparatus according to the present invention.
Figure 4:
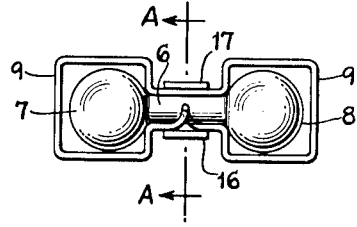
Figure 4 is a top view of the test piece and loops of Figure 3.
Figure 5:
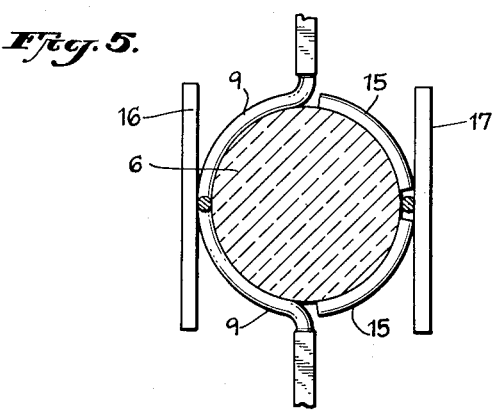
Figure 5 is an enlarged cross section along the lines A—A, in Figure 4 showing attached mirrors.

In Figure 1 is shown a test piece 1, suspended by a fibre 2 between the magnetic pole pieces 3 and 4. A continuous double loop of wire 5 encircles the test piece as shown, the plane in which the wire lies being at right-angles to the fibre 2, and substantially to the magnetic lines of force. In Figure 2 is shown the test piece comprising bar 6 carrying spheres 7 and 8. In Figures 3 and 4, the wire 9 encircles the test piece as shown, being cemented to the bar 6. The ends of the wire 9 are taken respectively to the central top and bottom part of the bar, to give balanced suspension and are connected to electrically conductive suspension strips 10 and 11 suspended from the support 12, mounted in the pole pieces 13 and 14. The manner of cementing the wire to the bar is shown in Figures 3 and 4. In Figure 5 is also shown a counterweight piece of wire 15 which balances the weight of the wire 9 encircling the other side of the bar 6. Also in this Figure 5 are shown mirrors 16 and 17 attached to the sides of the bar. A mirror is attached to both sides of the bar to maintain the test piece completely balanced. In this way the test piece may be suspended at its centre of inertia, and the instrument thereby rendered level insensitive.

Figure 6:
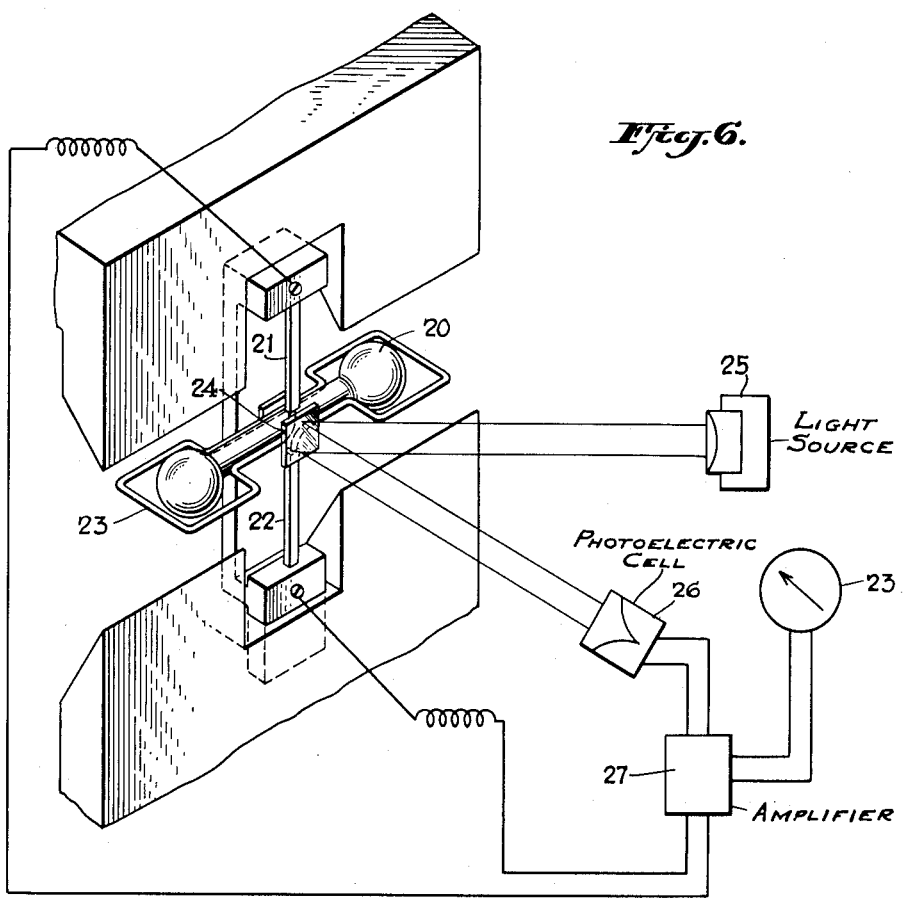
Figures 6 and 7 are partly schematic diagrams with portions of the associated apparatus represented by blocks showing two arrangements of the analyzer.

In Figure 6 is shown a partly schematic diagram with portions of the associated apparatus represented by blocks, of self-balancing apparatus embodying the test piece as shown in Figures 2, 3 and 4.

The test piece 20 is suspended by the electrically conductive suspension strips 21 and 22 which are connected respectively to the ends of the looped wire 23. The mirror 24 is cemented to the test piece as previously shown. A light source 25 provides a beam of light reflected by the mirror 24 on to a photo-electric cell system 26. Motion of the test piece generates current at the photo-electric cell system, the output from which is modified and amplified by means 27, and applied to the ends of the looped wire as shown to induce a moment equal and opposite to the magnetic moment acting on the test piece, thereby returning the test piece to its balance position. The output from the photo-electric cell system is measured or recorded by suitable means 28 which thereby indicates the extent of the magnetic moment acting on the test piece, and thus of the composition of the gas surrounding said test piece.

A photo-electric cell system which could be used in the self-balancing apparatus of the present invention is described in the Radiation Laboratory Series (McGraw-Hill), vol. 18, page 490, 1949.

Figure 7:
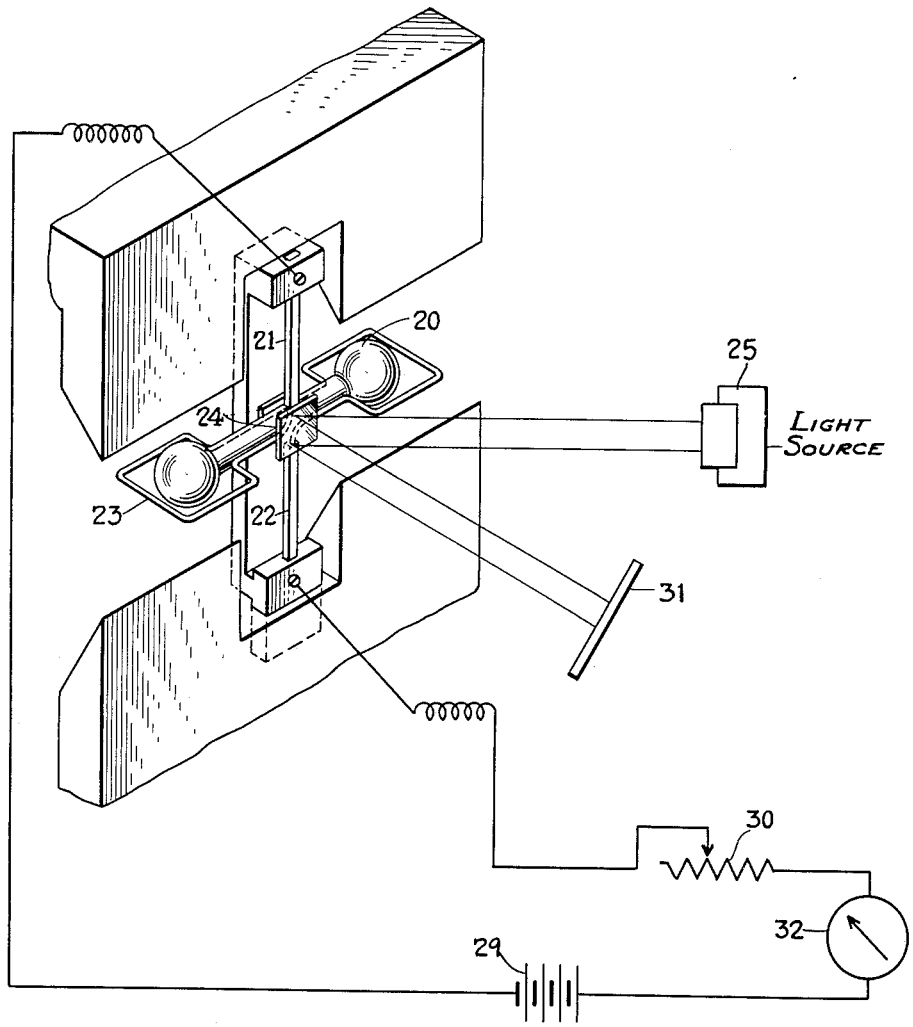

In Figure 7 is shown a partly schematic diagram with portions of the associated apparatus represented by blocks of a manually-adjusted balanced apparatus. In the diagram the parts 20, 21, 22, 23, 24 and 25 are as indicated in Figure 6. 29 is a battery connected in series with a meter, 32, and a variable resistance, 30. Movement of the test piece causes a light spot to move along scale 31. A suitable electric current is then passed through the circuit by means of the battery and variable resistance, which can be adjusted by hand, to return the light spot to zero. At this point a moment equal and opposite to the magnetic moment acting on the test piece has been induced by the electric current. The current is measured by the meter 32 which thereby indicates the extent of the magnetic moment acting on the test piece, and thus the composition of the gas surrounding said test piece.

We claim:

1. An apparatus for measuring the magnetic susceptibility of gases comprising a cell for receiving the gas whose susceptibility is to be measured, means for producing a non-uniform magnetic field in said cell, a test piece rotatably supported in said cell and in said magnetic field, said test piece varying its position in said cell in accordance with the magnetic susceptibility of said gas, a pair of conductive loops mounted for movement with said test piece, one of said loops being mounted on one side of the axis of rotation of said test piece and the other of said loops being mounted on the opposite side of said axis and said loops lying in a plane which intersects said axis at an angle, and means conductively connecting the ends of said loops.

2. An apparatus as in claim 1 wherein said last-mentioned means conductively connects the ends of one said loop to the ends of the other said loop.

3. An apparatus as in claim 1 wherein said last-mentioned means comprises a source of electric current, means for adjusting the magnitude of said current and means for connecting said source, said adjusting means and said loops in series.

4. An apparatus for measuring the magnetic susceptibility of gases which comprises a magnet, a cell providing a chamber between the facing poles of said magnet, said cell being made of a substantially non-magnetic material and having a frame and two magnetic pole pieces shaped to produce a non-uniform magnetic field fitting in the ends thereof, an elongated test piece suspended substantially at its centre of gravity between the two pole pieces on a fibre rigidly supported at both ends within the chamber, and means for the passage of gas through the chamber, said chamber being otherwise substantially gas tight when in position between the poles of the magnet, wherein a rigid frame comprising a length of wire encircles each arm of the test piece separately in a loop, both said loops being of substantially equal dimensions and lying in the same plane which passes longitudinally through the test piece and which is substantially at right angles to the lines of force in the non-uniform magnetic field, wherein means are provided for the passage of an electric current through the rigid frame, and wherein means are provided for the measurement of the angular deflection of the test piece in accordance with the magnetic susceptibility of the gas in said chamber.

5. An apparatus as in claim 4 wherein the passage of an electric current is induced by connecting together the two ends of the length of wire forming the rigid frame.

6. An apparatus as in claim 4 wherein external means are provided for the passage of an electric current through the wire forming the rigid frame.

7. An apparatus as in claim 6 wherein the electric current supply is associated with indicating or recording means.

8. An apparatus as in claim 7 wherein means are provided to adjust the electric current passed through the wire forming the rigid frame, to induce a moment in the test piece equal and opposite to the magnetic moment acting on the test piece.

9. An apparatus as in claim 8 wherein the adjustment means comprise a mirror carried by the test piece or its suspension means, a photo-electric cell system, a light source adapted to provide a light spot reflected by the mirror on to the photo-electric cell system, electrical means to amplify the output from the photo-electric cell system, means to apply said amplified output to the two ends of the wire forming the rigid frame and indicating or recording means operated by said output, whereby motion of the test piece under the magnetic moment causes a reaction in the photo-electric cell system and the amplified output from the photo-electric cell system induces in the test piece a moment equal and opposite to the magnetic moment.

10. An apparatus for measuring the magnetic susceptibility of gases comprising a cell for receiving the gas whose susceptibility is to be measured, means for producing a non-uniform magnetic field in said cell, a test piece rotatably supported in said cell and in said magnetic field, said test piece varying its position in said cell in accordance with the magnetic susceptibility of said gas, a pair of conductive loops mounted for movement with said test piece, one of said loops being mounted on one side of the axis of rotation of said test piece and the other of said loops being mounted on the opposite side of said axis and said loops lying in a plane which intersects said axis at an angle, means conductively connecting the ends of said loops, and means for measuring the angular deflection of said test piece.

11. An apparatus for measuring the magnetic susceptibility of gases comprising a cell for receiving the gas whose susceptibility is to be measured, means for producing a non-uniform magnetic field in said cells, a test piece rotatably supported in said cell and in said magnetic field, said test piece varying its position in said cell in accordance with the magnetic susceptibility of said gas, a pair of conductive loops mounted for movement with said test piece, one of said loops being mounted on one side of the axis of rotation of said test piece and the other of said loops being mounted on the opposite side of said axis and said loops lying in a plane which intersects said axis at an angle, and means conductively connecting the ends of said loops, said last-mentioned means comprising a source of electric current, means for adjusting the magnitude of said current and means for connecting said source, said adjusting means and said loops in series, said loops being connected so that current flowing therein produces magnetic fields which produce forces urging said loops around said axis of rotation in the same direction.

References Cited in the file of this patent
UNITED STATES PATENTS

| | | |
|---|---|---|
| 2,416,344 | Pauling | Feb. 25, 1947 |
| 2,448,111 | Nicolai | Aug. 31, 1948 |

OTHER REFERENCES

Instruments and Automation, May 1954, pages 774 and 775.